US007992174B2

(12) United States Patent
Gin et al.

(10) Patent No.: US 7,992,174 B2
(45) Date of Patent: Aug. 2, 2011

(54) METHOD AND SYSTEM FOR DOWNSTREAM TIME STAMP IN AN ADAPTIVE MODULATION BASED SATELLITE MODEM TERMINATION SYSTEM

(75) Inventors: Alan Gin, Corona Del Mar, CA (US); Jen-Chieh Chien, Lake Forest, CA (US)

(73) Assignee: Broadcom Corporation, Irvine, CA (US)

(*) Notice: Subject to any disclaimer, the term of this patent is extended or adjusted under 35 U.S.C. 154(b) by 1276 days.

(21) Appl. No.: 11/091,902

(22) Filed: Mar. 29, 2005

(65) Prior Publication Data

US 2005/0229217 A1 Oct. 13, 2005

Related U.S. Application Data

(60) Provisional application No. 60/556,873, filed on Mar. 29, 2004.

(51) Int. Cl.
*H04N 7/20* (2006.01)
*H04B 7/212* (2006.01)
*H04L 7/02* (2006.01)

(52) U.S. Cl. ............................ 725/63; 370/324; 375/359

(58) Field of Classification Search ...................... 725/63
See application file for complete search history.

(56) References Cited

U.S. PATENT DOCUMENTS 5,953,636 A * 9/1999 Keate et al. .................. 455/3.02
6,353,604 B2 * 3/2002 Grimwood et al. ........... 370/335

(Continued)

FOREIGN PATENT DOCUMENTS
WO    WO 9921287 A1 *    4/1999

OTHER PUBLICATIONS

IEEE 802.16pc-99/11, IEEE 802.16 Broadband Wireless Access Working Group, "DVB and DOCSIS Physical Layer Proposal for the 802.16 Air Interface Specification", Oct. 29, 1999.*
IEEE 802.16.3c-01/58r1,IEEE 802.16 Broadband Wireless Access Working Group, "Draft Document for SC-FDE PHY Layer System for Sub 11 GHz BWA", May 5, 2001.*

(Continued)

*Primary Examiner* — Hunter B Lonsberry
*Assistant Examiner* — James R Marandi
(74) *Attorney, Agent, or Firm* — Sterne, Kessler, Goldstein & Fox P.L.L.C.

(57) ABSTRACT

Provided are a method and system for determining system time in a satellite based cable data communication system. The system includes a satellite modem termination system configured to transmit data frames to a receiver in a predetermined symbol rate. Each frame includes a corresponding number of symbols and has a time stamp (i) indicative of the frame's time of transmission and (ii) positioned within the frame at a location common to all of the frames. The method includes receiving at least two consecutively transmitted data frames within the receiver and registering the time stamp of the first received data frame within the receiver to produce a first time stamp. Also, the time stamp of the second received data frame is registered within the receiver to produce a second time stamp. The time of transmission of the second transmitted data frame is updated, wherein the updating is a function of the first time stamp, the second time stamp, the corresponding number of symbols, and the symbol rate.

16 Claims, 8 Drawing Sheets

U.S. PATENT DOCUMENTS

| | | | |
|---|---|---|---|
| 6,633,621 B1* | 10/2003 | Bishop et al. | 375/376 |
| 6,698,022 B1* | 2/2004 | Wu | 725/111 |
| 2001/0053193 A1* | 12/2001 | Mitra et al. | 375/356 |
| 2002/0080070 A1* | 6/2002 | Harles et al. | 342/458 |
| 2002/0105976 A1* | 8/2002 | Kelly et al. | 370/519 |
| 2004/0073929 A1* | 4/2004 | Morello | 725/63 |
| 2005/0005304 A1* | 1/2005 | Kaul et al. | 725/118 |

OTHER PUBLICATIONS

G.C. Hsieh et al., "Phase-Locked Loop Techniques—A Survey", IEEE Transactions on Industrial Electronics, Dec. 1996.*

A. Efendovich et al., "Multi-Frequency Zero-Jitter Delay-Locked Loop", IEEE 1993 custom Integrated Circuits Conference.*

* cited by examiner

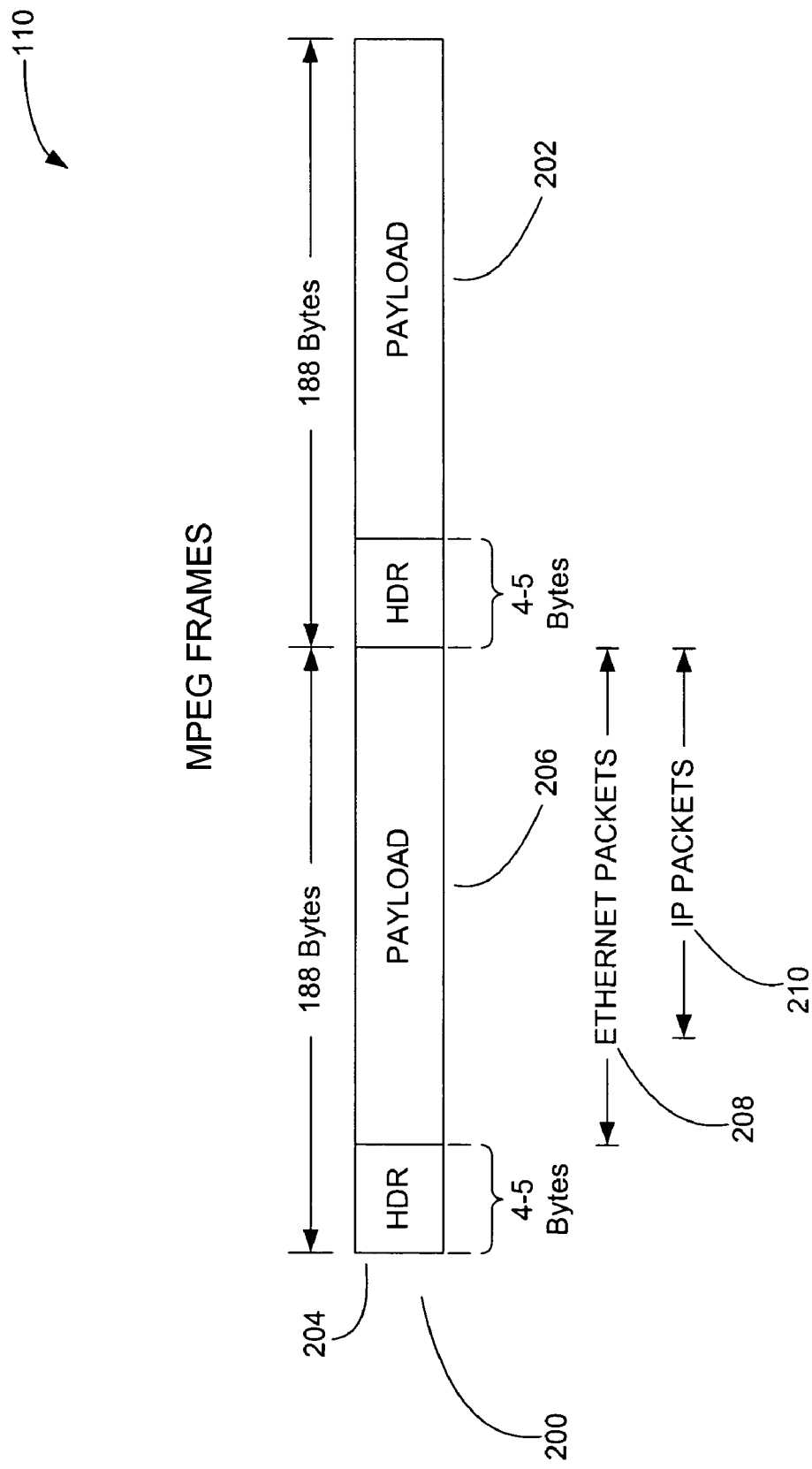
FIG. 2
(conventional)

METHOD AND SYSTEM FOR DOWNSTREAM TIME STAMP IN AN ADAPTIVE MODULATION BASED SATELLITE MODEM TERMINATION SYSTEM

CROSS-REFERENCE TO RELATED APPLICATIONS

This application claims the benefit of U.S. Provisional Application No. 60/556,873, filed Mar. 29, 2005, which is incorporated herein in its entirey by reference.

BACKGROUND OF THE INVENTION

1. Field of the Invention

The present invention relates generally to transmission of data frames within a satellite based cable system. More particularly, the present invention relates to synchronizing timing between components included within the satellite based cable system.

2. Related Art

Traditional cable systems transmit data in accordance with DOCSIS cable system standards. A common frame structure used within these DOCSIS based cable systems is the motion pictures expert group (MPEG) frame structure. Although the DOCSIS standards traditionally pertain to non-satellite based cable systems, various aspects and modifications of the DOCSIS standards now apply to both the upstream and downstream channels of satellite based cable systems. One such modification is known as adaptive modulation.

As known in the art, adaptive modulation is a signal processing technique used for downstream channels on traditional satellite based cable systems to maximize data rates. Adaptive modulation enables modulation schemes to adapt to changing transmission channel characteristics on a frame by frame basis. In one implementation, for example, adaptive modulation provides an ability to change physical downstream parameters, particularly along MPEG frame boundaries.

Satellite based cable systems typically use a satellite modem termination system (SMTS) to transmit data frames via a satellite network to cable subscribers. Each cable subscriber has a modem (subscriber modem) specifically configured to receive specific frames from among a stream of transmitted MPEG data frames. Adaptive modulation enables the SMTS to send the specific data frames within the stream to the different subscriber modems based on that modem's ability to receive data. Thus, within a transmitted data stream including consecutive data frames, the first frame may go to a first subscriber modem and the second data frame may go to a second subscriber modem. In such a transmission scenario, in order for the SMTS to use the most efficient transmission parameters and optimize the use of available data width, MPEG frame timing is absolutely essential.

In order to optimize the operational speed and efficiency of satellite based cable systems, an appropriate adaptive modulation scheme should be selected. The appropriate scheme will enable the SMTS to send the MPEG to the intended subscriber modem. Several components within the traditional SMTS are particularly relevant to this process. These relevant components include a media access control (MAC) chip for performing media access control and packet processing of internet protocols (IPs) embedded within the MPEG data frame. Also included is a MAC clock, for time stamping the MPEG data frames, and a modulator.

A traditional MAC chip time stamps received data frames and stores this timing data in a time stamp register, usually within the MAC chip. The time-stamped frames are then forwarded to the modulator and subsequently transmitted via satellite to one or more subscriber modems. Prior to transmission, each time stamped data frame is provided to the modulator, where each data frame is modulated based upon predetermined transmission characteristics.

Since different modulation techniques are applied (adaptively) to different data frames, each technique creates slight timing skews between the time stamp value and the time the frame is actually transmitted. These skews result from differences and complexities of the various adaptive modulation techniques that are applied. Additionally, the severity of these timing skews is exacerbated by atmospheric and other delays created during actual transmission.

While some timing errors can be compensated for within the subscriber modems, skews resulting from application of the adaptive modulation techniques cannot be as easily resolved. Additional timing errors are created due to drift between the MAC clocks and clocks within the modulator.

What is needed, therefore, is a technique to resolve downstream transmission timing errors in data frames that are adaptively modulated for transmission within a satellite based cable system. What is also needed, is a technique and mechanism to minimize drift between the clocks of, for example, the MAC chip and the modulator within the SMTS.

SUMMARY OF THE INVENTION

Consistent with the principles of the present invention as embodied and broadly described herein, the present invention includes a method for determining system time in a satellite based cable data communication system, including a satellite modem termination system configured to transmit data frames to a receiver in a predetermined symbol rate. Each frame includes a corresponding number of symbols and has a time stamp (i) indicative of the frame's time of transmission and (ii) positioned within the frame at a location common to all of the frames. The method includes receiving at least two consecutively transmitted data frames within the receiver and registering the time stamp of the first received data frame within the receiver to produce a first time stamp. Also, the time stamp of the second received data frame is registered within the receiver to produce a second time stamp. The time of transmission of the second transmitted data frame is updated, wherein the updating is a function of the first time stamp, the second time stamp, the corresponding number of symbols, and the symbol rate.

Further features and advantages that the present invention as well as structure and operation of various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the present invention and, together with the general description given above and the detailed description of the embodiments given below, serve to explain the principles of the invention. In the drawings:

FIG. 2 is an illustration of a conventional MPEG data frame;

DETAILED DESCRIPTION OF THE INVENTION

Figure 1:
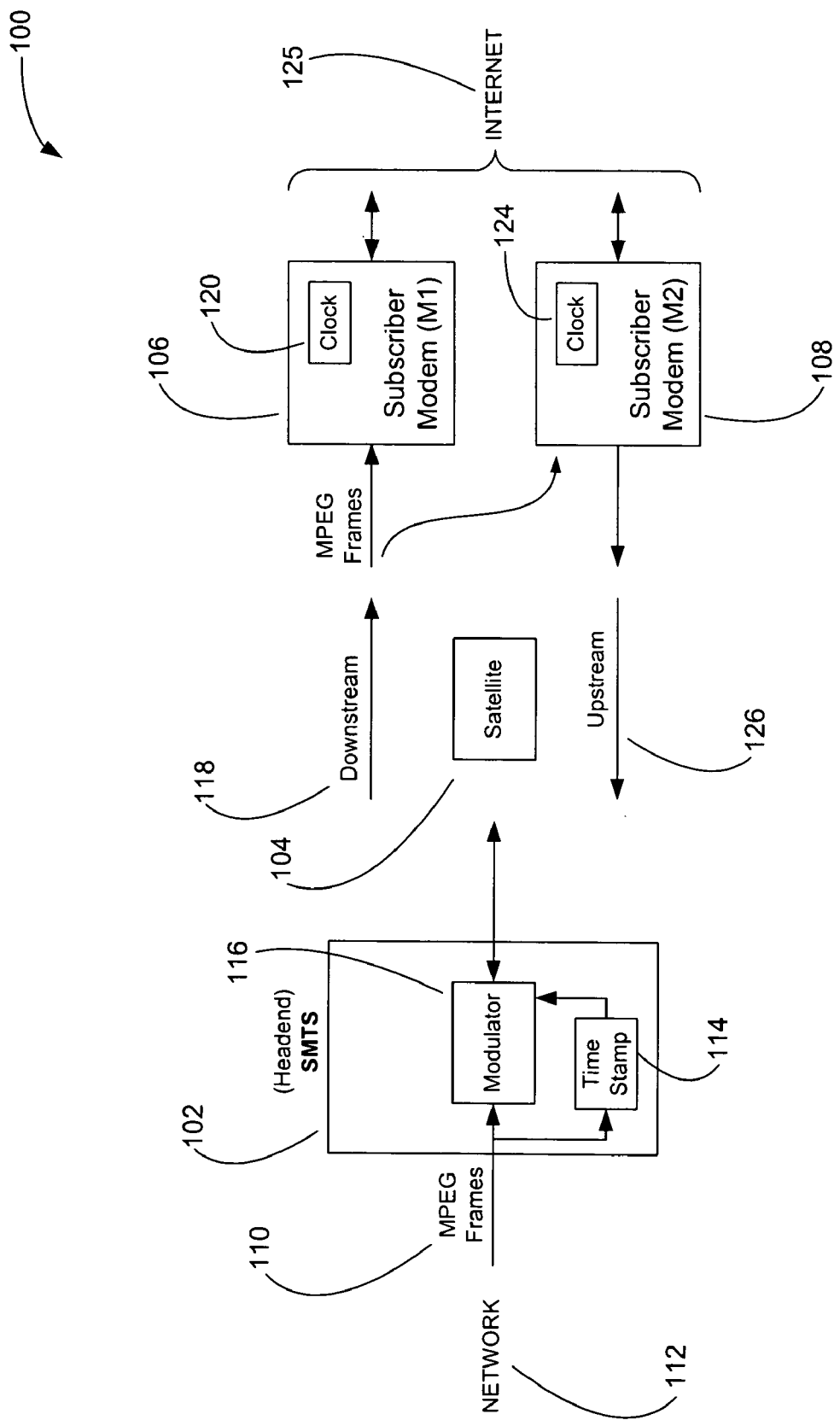
FIG. 1 is a block diagram illustration of a satellite based communications system.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of a satellite based cable system constructed in accordance with an embodiment of the present invention. In FIG. 1, a satellite based cable system 100 includes an SMTS (head-end) 102, a satellite 104, and subscriber modems 106 and 108. The SMTS 102 is configured to receive MPEG data frames 110 transmitted via a conventional network 112.

FIG. 2 provides a more detailed illustration of a conventional structural format of the MPEG frames 110. In FIG. 2, the MPEG frames 110 can include, for example, individual MPEG frames 200 and 202. Each MPEG frame includes a header portion 204 and a payload portion 206 that are 188 bytes in length, combined. The header 204 is typically four to five bytes in length. Within the context of the satellite cable system 100, shown in FIG. 1, each of the MPEG frames 110 includes Ethernet packets 208 within its payload portion. And within each of the Ethernet packets 208, are EP packets 210.

Referring back to the example of FIG. 1, the MPEG frames 110 are forwarded from the network 112, to the SMTS 102. Within the SMTS 102, some of the MPEG frames 110 are time stamped by a time stamping device 114, which could be a system clock. Subsequently, the MPEG frames 110 are modulated within a modulator 116 in preparation for transmission.

In the example of FIG. 1, the modulated MPEG frames are forwarded, via the satellite 104, along a downstream communications path 118 to one of the subscriber modems 106 and 108. The subscriber modems 106 and 108 respectively include clocks 120 and 124 to synchronize reception and performance of other timing tasks associated with the received MEPG frames 110. Next, the MPEG frames can be forwarded to some other network such as the Internet 125.

In the present invention, as briefly noted above, adaptive modulation provides the ability to change downstream transmission parameters in accordance with the communications link and processing capability of the receiving subscriber modems. More particularly, adaptive modulation entails modifying the downstream physical parameters and is triggered by the frame boundaries of the MPEG frames 110. Although MPEG frames include numerous physical parameters, the physical parameters of interest in the present invention include modulation, code rate, and the size and error rate associated with the Reed Solomon code word.

By way of background, some downstream subscriber modems are not required to receive the entire content of each MPEG frame, since a portion of the frame data may be intended for a different modem. These subscriber modems, therefore, only receive a subset of the MPEG frames. In non-adaptive modulation based cable systems, this data "apportionment" is not problematic because all MPEG frames are transmitted with the same physical parameters.

Data apportionment, however, is somewhat inefficient in the non-satellite based cable systems because all transmitted MPEG frames must satisfy the capabilities of the worst case modem. Some subscriber modems can receive downstream data fairly robustly. On the other hand, some subscriber modems have a less robust downstream connection because of environmental factors such as rain, clouds, and noise, etc. Therefore, in order to accommodate all of the subscriber modems, the SMTS must choose physical parameters consistent with the least capable subscriber modem. This process ensures that every modem can receive the transmission.

As noted above, certain of the downstream physical parameters can be changed from frame to frame, or from Q-block to Q-block. Among these changeable parameters are the modulation, the code rate, and the size and error rate of the Reed Solomon code word. Changing the modulation, for example, provides certain advantages. Using more complex modulation schemes facilitates use of higher transmission data rates. On the other hand, if a more complex modulation scheme and a higher data rate are selected, all of the modems must be able to receive at these higher data rates.

Typical code rate values can range between 1/3, 1/2, 1/4, 2/3, 5/5, and 7/8. Within this scale, for example, 1/3rd is typically used for data and 2/3rds provides better error correction. Although code rates of 2/3 provide better error correction, meaning they are more robust, they are also inefficient. Code rates in the range of 7/8 are very efficient, but are less robust.

The size and the error rate of the Reed Solomon code word is one other downstream parameter that can be changed within the context of the present invention. As a general rule of thumb, the smaller the Reed Solomon code word, and the bigger its corresponding segment, the smaller the amount of actual data that can be represented.

On cable modems, the modulation scheme, the code rate, and the Reed Solomon code word are set and rarely change. That is, all modems receive at the same rate. However, with adaptive modulation, and why this concept is significant in a satellite environment is that the modulation, the code rate, and the size and error rate associated with the Reed Solomon code word can be changed, based upon MPEG frame boundaries.

As an example of the flexibility of adaptive modulation, in the example of FIG. 1, the subscriber modem 106 may be able to receive at a signal to noise ratio level of 15, which would be representative of a fairly strong modem. However, the subscriber modem 108 may only be able to receive at a signal to noise ratio level of 8, representative of a much weaker modem. In this example, the information transmitted to the subscriber modem 108 must be transmitted with more robust downstream physical parameters. Thus, the subscriber modem 108 might need to receive data using a more complex modulation scheme.

At the same time, the subscriber modem 106 receives data at a higher signal to noise ratio level, so it might be able to receive data at a modulation rate of 16 pre-emphasized-de-emphasized amplitude-modulation (PRAM) and a code rate of 7/8. The advantage here is that if one were to examine the downstream transmitted MPEG data frames, for example, the MPEG frames 200 and 202, the MPEG frame 200 can contain data intended for both the subscriber modem 106 and 108. The subscriber modem 106 may be able to receive the MPEG frame 200 and 202 because of more efficient and more robust data handling capability within the subscriber modem 106. Consequently, the subscriber modem 106 may occupy a much smaller amount of bandwidth because it can handle more data with less effort.

Figure 3:
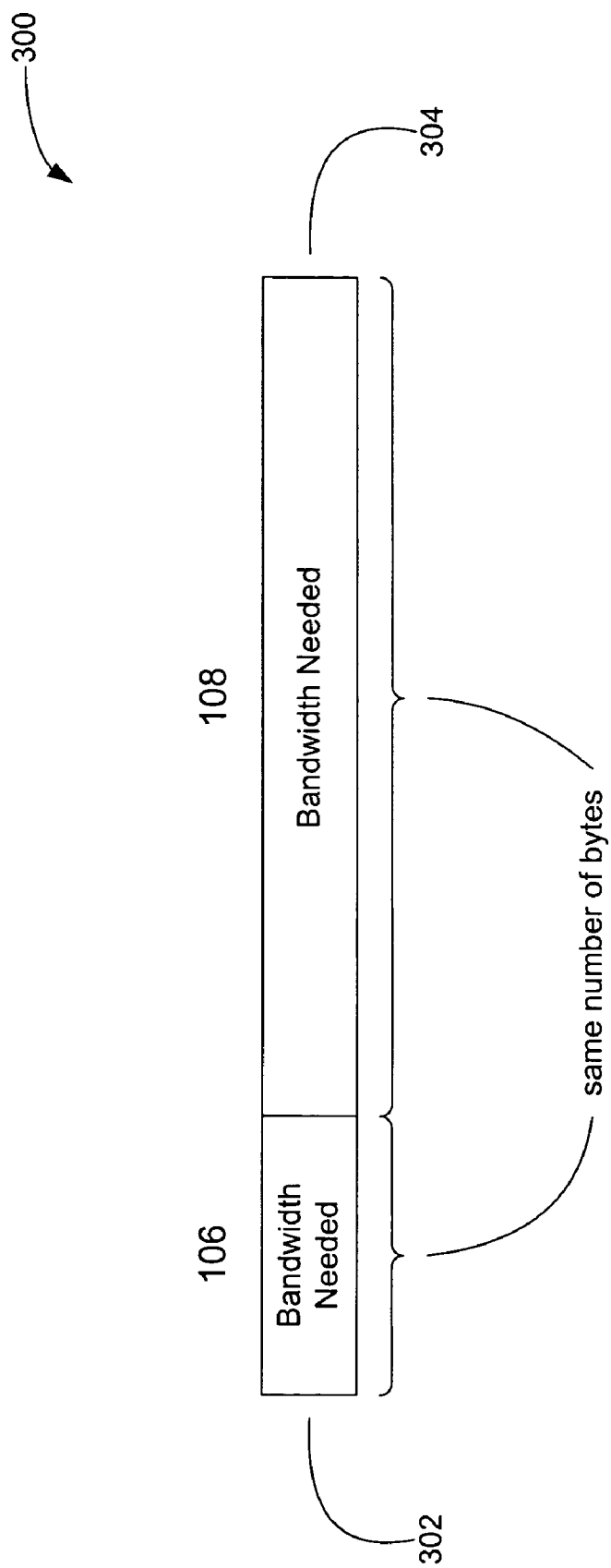
FIG. 3 is an illustration of bandwidth requirements for transmitting different data frames to different subscriber modems.

FIG. 3 is an illustration of relative differences in bandwidth requirements that can exist between the subscriber modems 106 and 108. As illustrated in FIG. 3, a comparatively small amount of bandwidth 302 is required by the subscriber modem 106 because of its more efficient data handling capability. The subscriber modem 108, on the other hand, may need a greater amount of bandwidth 304 in order to receive the same number of data bytes as the subscriber modem 106. Thus, in terms of time domain, the lower rate modem 108 is occupying more bandwidth 304, and the higher rate modem 106 requires less bandwidth 302.

Stated another way, the benefit of downstream adaptive modulation is demonstrated in the example of a single satellite sending data frames to 1000 satellite modems. For purposes of illustration, 20 of the satellite modems may be under very cloudy or even rainy conditions, whereby their signal to noise ratio ability to receive will decrease substantially. At the same time, there may still be more than 980 modems that can receive at a higher data rate. Adaptive modulation eliminates the need to bring the entire satellite based cable system down to its least common denominator modem. Adaptive modulation provides this ability by providing a more efficient manner to distribute available bandwidth.

Figure 4:
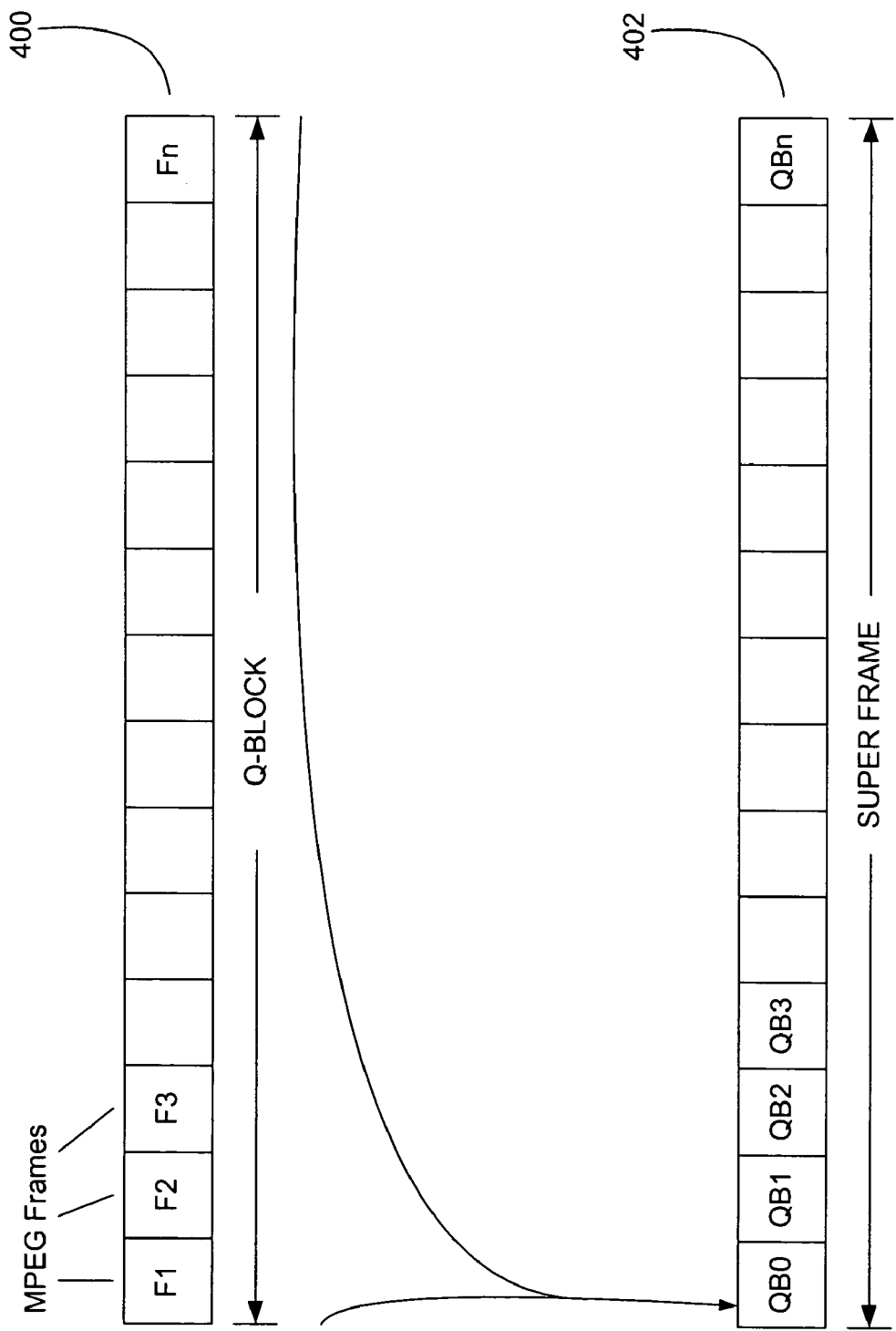
FIG. 4 is an illustration of Q-blocks and super frames associated with MPEG standards.

FIG. 4 is an illustration of additional structure within MPEG data frames. The DOCSIS system specification describes an efficient approach to collecting and transmitting MPEG frames. This DOCSIS based approach entails grouping together MPEG frames that have the same physical parameters and then transmitting these frames consecutively. Consecutively transmitted frames form Q-blocks, such as a Q-block 400, as illustrated in FIG. 4. A super-frame 402 (assembled within the SMTS 102) is representative of a collection of consecutively transmitted Q-blocks. Consistent with this approach the Q-block 400 includes MPEG frames F1 through Fn, which all share the same physical parameters.

Not covered under DOCSIS is a method of grouping consecutive MPEG frames with the same physical parameters into what is defined as a Q-block. With this Q-block, all MPEG frames will be transmitted with the exact same modulation code rate, and Reed-Solomon (RS) parameters.

Within the super-frame 402, each of the Q-blocks QB0-QBn, may have different physical parameters. However, each of the Q-blocks QB0-QBn, will have the same basic transmission parameters. One of these basic transmission parameters is the symbol rate. That is, all of the symbols within the Q blocks QB0-QBn share a common transmission symbol rate. The significance of the common symbol rate will be discussed in additional detail below.

An additional requirement of the DOCSIS specification is a requirement that all of the downstream MPEG super-frames, such as the super-frame 402, must be time stamped. Within the DOCSIS specification, a 32 bit time stamp value is stored within registers of the modulators, and other components, within the SMTS 102 and the subscriber modem 106. Each of the associated time stamp registers is incremented upon generation or receipt of a super-frame.

Figure 5:
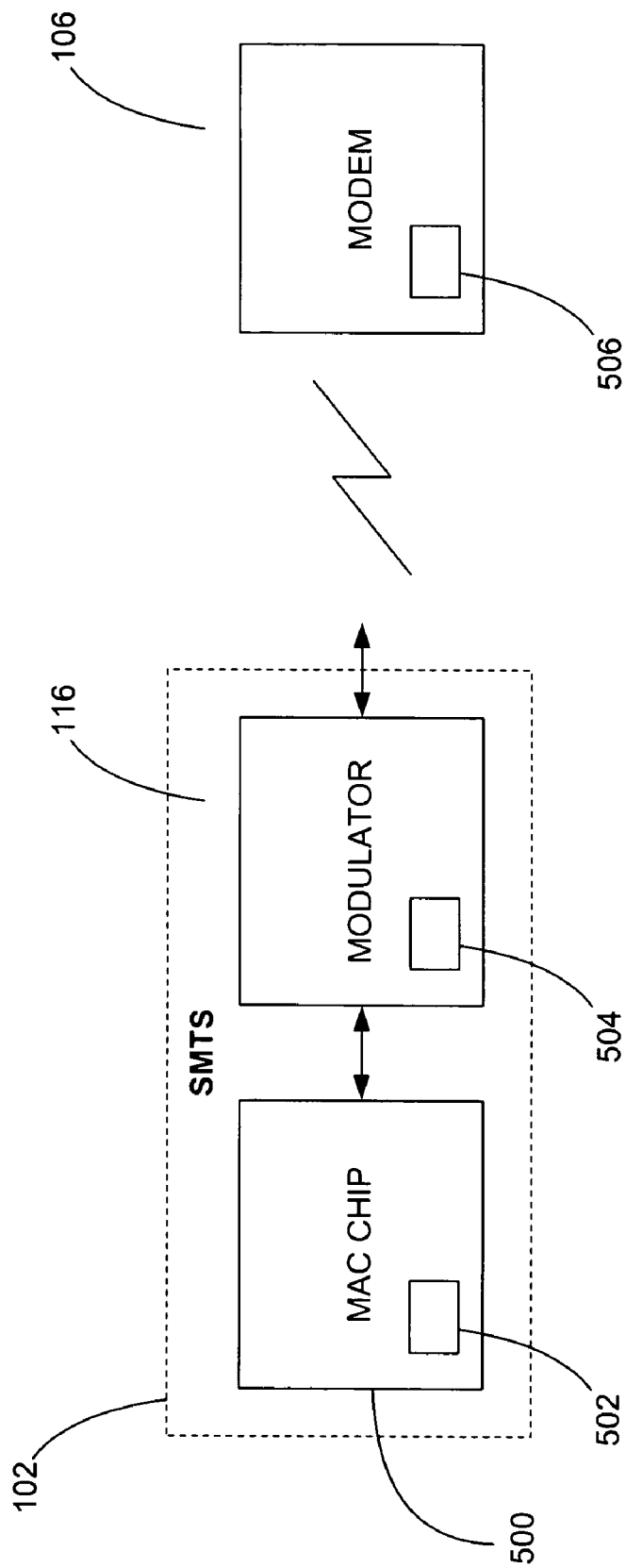
FIG. 5 is a block diagram illustration of the SMTS and the modem M1 shown in FIG. 1.

FIG. 5 provides a more detailed block diagram illustration of the SMTS 102 and the modem 106 as well as additional details of the time stamping process. In FIG. 5, a more detailed block diagram illustrates that the SMTS 102 includes a MAC chip 500 and the modulator 116. The MAC 500 provides processing of MAC layer protocol information for the IP packets 210 embedded within the MPEG frames, as noted above.

The MAC chip 500 and the modulator 116 respectively include time stamp registers 502 and 504. It is desirable that the time stamp values stored within the registers 502 and 504 be as accurate as possible. Time stamp accuracy is desirable so that when the subscriber modem 106 receives super frames, it can perform an internal timing check. During this check, the subscriber modem 106 compares the time stamps of the received super frame with time stamps stored within an internal time stamp register 506.

These time stamp comparisons enable modems, such as the subscriber modem 106, to ensure that timing skews between the received frames be within expected tolerances. These tolerances help maintain synchronism between the SMTS 102 and the modem 106. They also enable the cable system 100 to keep up with the concept of time as generated within the SMTS 102. The DOCSIS specification requires that when the satellite modems receive super-frames, the corresponding time stamp values should be accurate within not more than threshold tolerances specified within the DOCSIS specification.

Modems associated with satellite based cable system modems utilize adaptive modulation in their downstream data path. A challenge here is that when the super frames are time stamped within the MAC chip 500, the associated time stamp value changes by the time the super frame exits the modulator 116.

It's a relatively straightforward process to receive a collection of time stamped MPEG frames as input to the modulator 116 and then output these frames from the modulator 116 at a predetermined symbol rate. However, across super-frame boundaries, different MPEG frames have different modulation schemes and different code rates. Therefore, although these time stamped super-frames enter the modulator 116 at a known time, the point in time at which they are actually transmitted cannot be easily determined. That is, the modulation scheme, encoded within the time stamped MPEG frames, indeterminately alters the true timing of these MPEG frames.

On the other hand, however, once the MPEG frames are output from the modulator 116 (put in the air) the timing is accurate and fixed relative to that particular moment in time. Thus, although the adaptive modulation techniques implemented within the modulator 116 indeterminately delay the MPEG frames, additional delays beyond the modulator 116 are minimal.

For purposes of illustration only, the 32 bit time stamp entered within the register 502 of the MAC chip is based on a 10.24 MHz clock. Although within the example of FIG. 5, the time stamp is 32 bits, in practice a time stamp of any suitable size can be used. The time stamp stored within the register 504 is based on a 30 MHz clock. As noted above, adaptive modulation changes physical parameters associated with the MPEG frames. All of the MPEG frames within a Q-block share the same symbol rate.

When the satellite based cable system 100 is activated, the system comes up at a particular symbol rate. That particular symbol rate remains unchanged until the system goes down. Therefore, all MPEG frames exit the modulator 116 at the same symbol rate. As previously noted, the time stamp value stored within the register 502 of the MAC chip 500 is relatively accurate up to the point at which the MPEG frames enter the modulator 116. Therefore, if the timing inaccuracies between the input to the modulator 116 and the input to the modem 106 can be resolved, more accurate time accounting for the cable system 100 can be provided.

Figure 6:
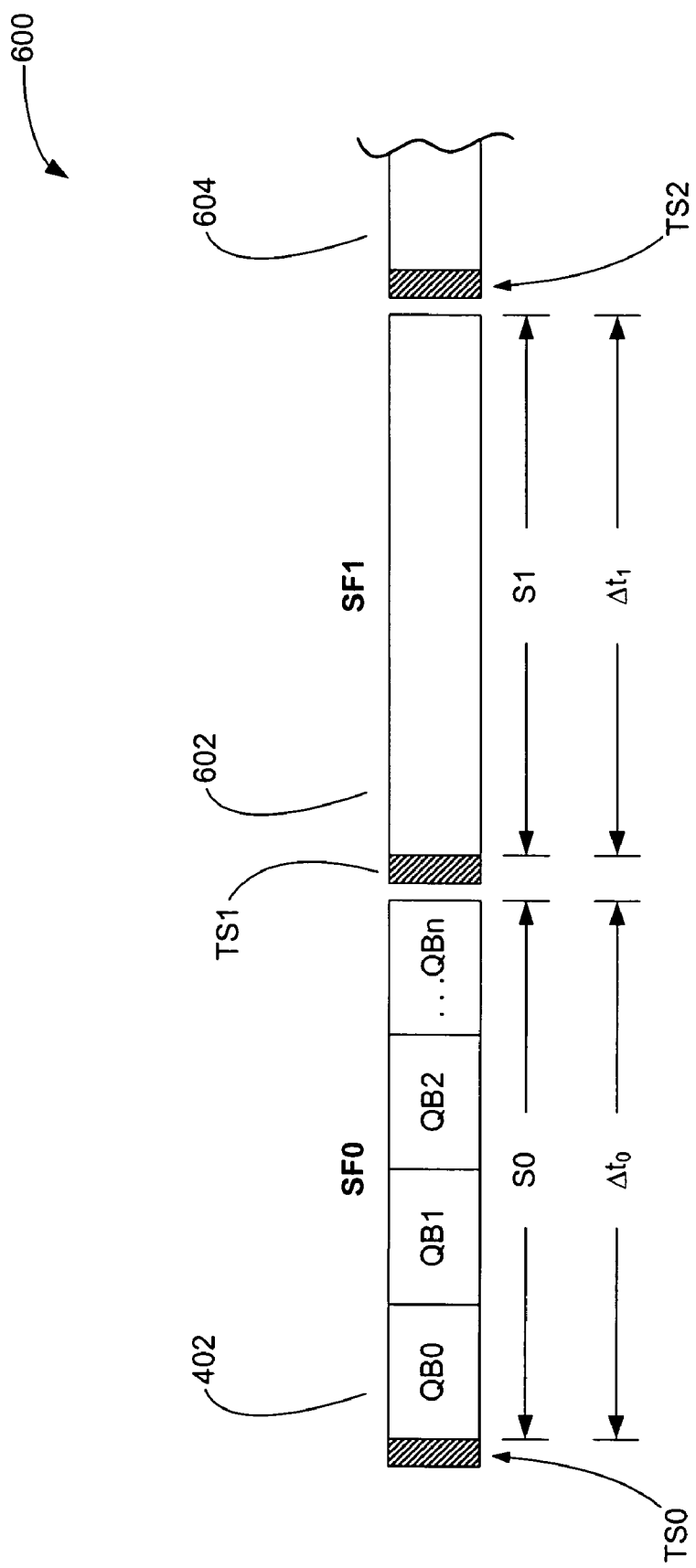
FIG. 6 is an illustration of MPEG super-frames in accordance with an embodiment of the present invention.

FIG. 6 provides a more detailed illustration of the super frames and Q-blocks associated with the satellite based cable system 100. In FIG. 6, a data-stream 600 is shown. The data-stream 600 includes adjacent super-frames 402 (shown in FIG. 4), 602, and 604. The super-frame 402 (also labeled SF0), provides additional details regarding the internal arrangement of Q-blocks within super-frames.

In the example of FIG. 6, as outlined in the DOCSIS specification, a time stamp TS0 is placed at the beginning of each super-frame. Next, adjacent Q blocks QB0-QBn are provided. Each of the Q-blocks QB0-QBn includes adjacent MPEG frames having the same physical parameters, as illustrated with the Q-block 400 of FIG. 4. Additionally, for example, the super-frames 402 and 602 include a predetermined number of symbols, denoted herein as S0 and S1 respectively. In the example of FIG. 6, time stamps TS0, TS1, and TS2 are placed at the beginning of respective super-frames 402, 602, and 604.

All of the time stamps TS0-TS2 occupy a predetermined number of bytes in accordance with the DOCSIS standards. Since the super-frames 402, 602, and 604 were constructed within the SMTS 102, the number of symbols S0 and S1 are all known. If the number of symbols S0 and S1 are known, and the symbol rate is known, then the time between each of the time stamps TS0 and TS1 is also known (denoted as $\Delta t_0$).

One component of the value of the time stamp TS1, is $\Delta t_0$. However, with the application of adaptive modulation principles within the modulators of conventional systems, the time stamp values (such as TS1) are inaccurate. The present invention, however, enables a more accurate determination of these time stamps values. The present invention uses the first time stamp as a reference, and updates the values of all subsequent time stamps, based on this reference. In the example of FIG. 6, the time stamp TS0, generated within the MAC chip 500, is the reference time stamp.

Although the MPEG frames within the Q block QB3 all have the same physical parameters, adjacent Q-blocks across super-frame boundaries can have different physical parameters. Therefore, the time required for Q-blocks to propagate through the MAC chip 500, the modulator 116, and the subscriber modem 106, will be different between the super-frames 402 and 602.

In embodiments of the present invention, once the reference time stamp TS0 travels through the system, the ensuing time stamps TS1, TS2, and all others that follow, can be accurately determined based upon the time difference between TS0 and TS1 ($\Delta t_0$). That is, TS1 and all other subsequent time stamps can be calculated on the basis of TS0, the number of symbols (e.g., S0 and S1), and the symbol rate, which is common throughout all of the super-frames transmitted within a communications session.

For purposes of illustration in the present invention, the time between the communication system 100 being brought up and the communication system 100 being taken down constitutes one transmission session. Thus, the symbol rate within a transmission session is a constant value. More specifically, TS1=TS0+$\Delta t_0$, where $\Delta t_0$=S0/(symbol rate). For example, if S0 is 30 million symbols and the symbol rate is 30 million symbols/second, then $\Delta t_0$ will equal one second. In the same manner, TS2 can be determined in accordance with the expression:

$$TS2 = TS0 + \Delta t_0 + \Delta t_1 = TS0 + (S0 + S1)/(\text{symbol rate}).$$

Therefore, by using the time reference TS0 as a reference point, all subsequent time stamps can be more accurately determined on the basis of the associated number of symbols, the symbol rate, and the value of time stamp TS0. This technique substantially reduces the MPEG frame counting inaccuracies that result from the application of adaptive modulation techniques.

Since the symbol rate clock is based on an imperfect clock, a method may be used to ensure that the time stamp generated by the symbol rate calculation will be as accurate as possible. One method, for example, is to allow the hardware to keep a symbol rate clock count. After, for example, 50 symbols have been counted from the symbol rate clock, a count of the 10.24 MHz clocks that have elapsed is obtained. This count of 50 10.24 MHz clocks will be the actual $\Delta t_0$. This exemplary method should then be repeated for all generated time stamps.

Figure 7:
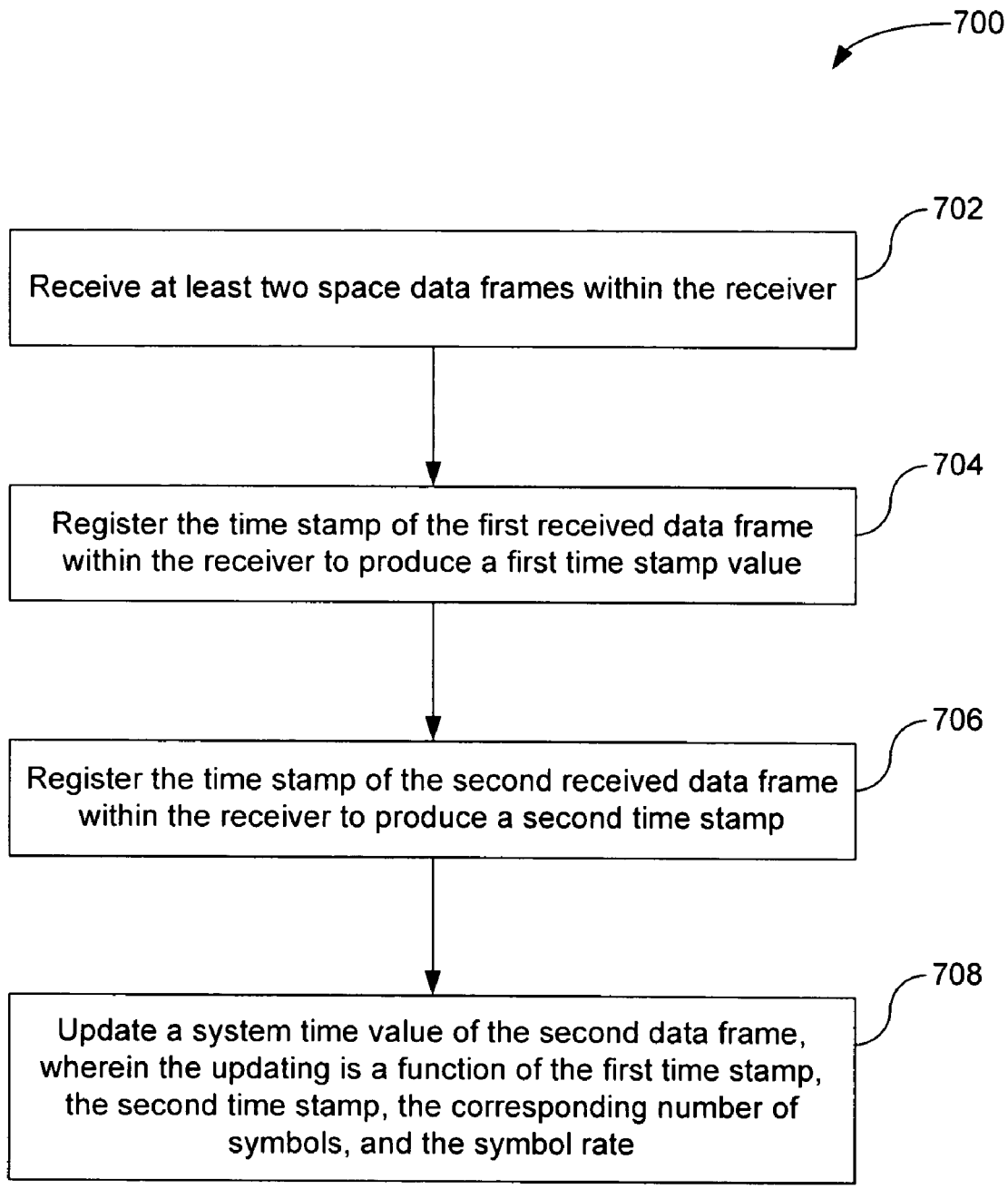
FIG. 7 is a flowchart of an exemplary method of practicing the present invention in accordance with one embodiment.

FIG. 7 is a flowchart of an exemplary method 700 of practicing an embodiment of the present invention. In FIG. 7, two consecutive data frames are received, for example, within the SMTS 102 as indicated in step 702. Next, the SMTS 102 time stamps the received data frames and stores a time stamp value of the first frame in a register (step 704) and stores the second time stamp value in the register (step 706). In a step 708, a system time value of the second frame is updated as a function of the first time stamp, the second time stamp, the corresponding number of symbols, and the symbol rate.

Although the foregoing technique provides more accurate system time, it does not, however, compensate for the effects of clock drift that can occur as a result of imprecise clocks within the MAC chip 500 and the modulator 116

Figure 8:
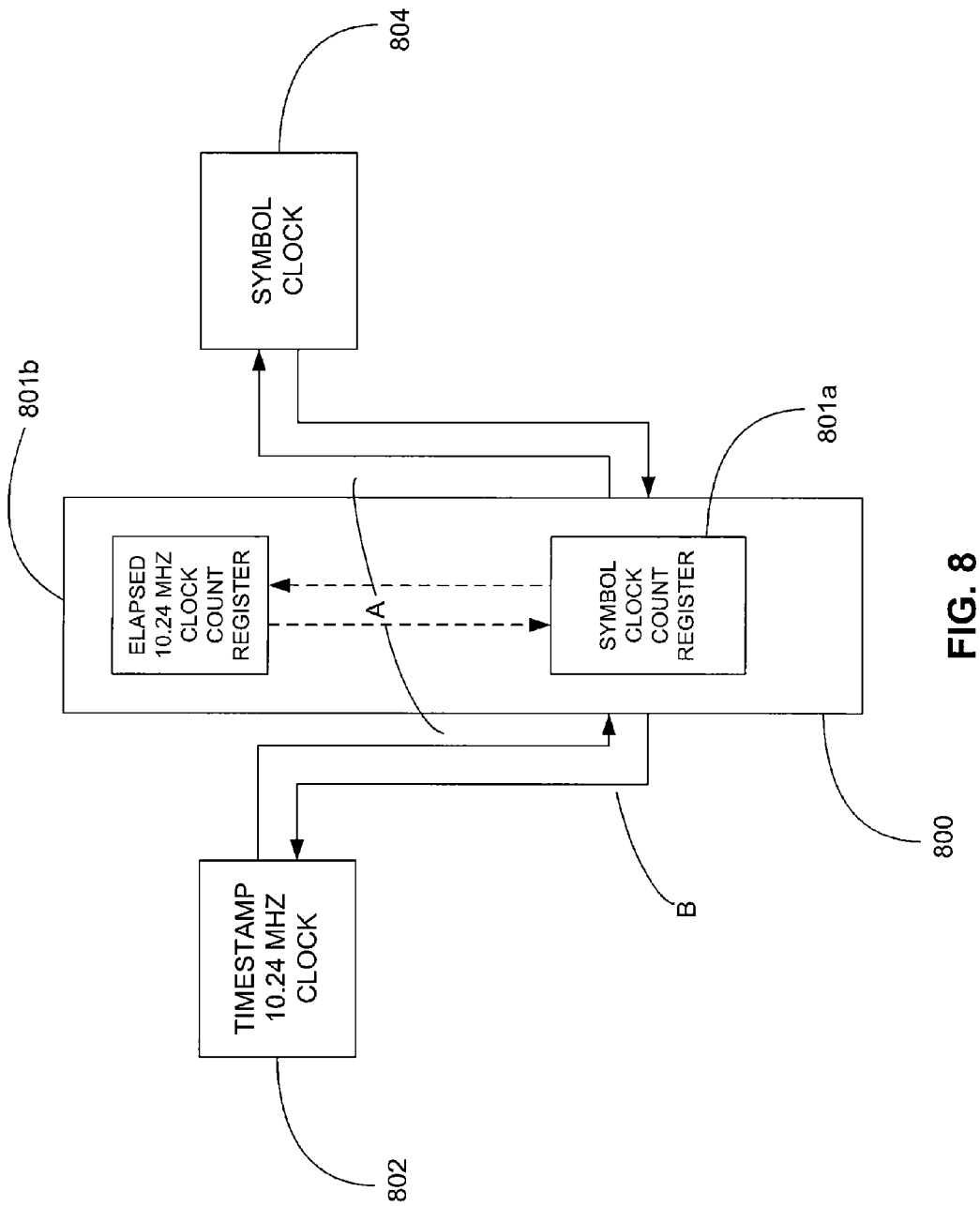
FIG. 8 is a block diagram illustration of a technique for synchronizing clocks in accordance with an embodiment of the present invention.

In the present invention, a register module 800 including a symbol clock count register 801*a* (e.g. 32 bits) and an elapsed 10.24 MHz clock count register 801*b* (e.g. 32 bits) can be used to ensure that a 10.24 MHz clock 802 and a symbol clock 804 (e.g. 5 MBaud to 30 MBaud) are in phase. Thus, in the example of FIG. 8, the register module 800 can be configured to operate along a path A to use the 10.24 MHz clock 802 to set the symbol clock 804. Alternatively, the register 800 can be configured to operate along a path B to use the symbol clock 804 to set the 10.24 MHz clock 802. Regardless of whether the connection path A or the connection path B is chosen, a device such as the register module 800 can ensure that the phases between the clocks 802 and 804 are substantially the same.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for determining updated system time stamps in an adaptive modulation based satellite modem termination system (SMTS) configured to transmit data frames to a receiver at a predetermined symbol rate, each frame including a corresponding number of symbols and having a time stamp (i) indicative of the frame's stamped system time value and (ii) positioned within the frame at a location common to all of the frames, the method comprising:
   receiving a reference data frame and at least one subsequent data frame within the receiver, wherein the at least one subsequent data frame includes a time stamp having a stamped system time value that differs from an actual system time at which the at least one subsequent data frame was transmitted;
   registering a reference stamped system time value from a time stamp of the received reference data frame within the receiver; and
   updating a stamped system time value for a time stamp of the at least one subsequent data frame;
   wherein the updating is a function of the reference stamped system time value, the corresponding number of symbols, and the symbol rate.

2. The method of claim 1, wherein the data frames are super frames as defined by motion picture experts group (MPEG) standards; and
   wherein the super frames include Q-blocks.

3. The method of claim 1, wherein each time stamp abuts a boundary of its corresponding frame.

4. The method of claim 1, wherein the reference data frame and at least one subsequent data frame are transmitted via open air.

5. The method of claim 4, wherein the time stamp of the reference data frame is a time base for the time stamps of subsequent data frames within a transmission session.

6. The method of claim 5, wherein a time of transmission of each subsequent data frame is a function of the time stamp of the reference data frame, the corresponding number of symbols, and the symbol rate.

7. The method of claim 6, wherein the updated stamped system time value for the timestamp of the subsequent data frame is defined in accordance with the expression $(ts1=ts0+\Delta t)$, where $(ts1)$ is the time stamp of the subsequent data frame, $(ts0)$ is the time stamp of the reference data frame, and wherein $\Delta t$ is defined as the corresponding number of symbols $(s0)$ divided by the symbol rate.

8. The method of claim 6, wherein the updated stamped system time value for the timestamp of the subsequent data frame is defined in accordance with the expression $(ts1=ts0+\Delta t)$, where $(ts1)$ is the time stamp of the subsequent data frame, $(ts0)$ is the time stamp of the reference data frame; and
   wherein $(\Delta t)$ is defined as a time lapse between the time stamp of the reference data frame and the time stamp of the subsequent data frame.

9. A system for determining updated system time stamps in an adaptive modulation based satellite modem termination system (SMTS) configured to transmit data frames to a receiver at a predetermined symbol rate, each frame including a corresponding number of symbols and having a time stamp (i) indicative of the frame's stamped system time value and (ii) positioned within the frame at a location common to all of the frames, the system comprising:
   a module operable to receive a reference data frame and at least one subsequent data frame within the receiver, wherein the at least one subsequent data frame includes a time stamp having a stamped system time value that differs from an actual system time at which the at least one subsequent data frame was transmitted;
   a module operable to register a reference stamped system time value from a time stamp of the received reference data frame within the receiver; and
   a module operable to update a stamped system time value for a time stamp of the at least one subsequent data frame;
   wherein the updating is a function of the reference stamped system time value, the corresponding number of symbols, and the symbol rate.

10. The system of claim 9, wherein the data frames are super frames as defined by motion picture experts group (MPEG) standards; and
    wherein the super frames include Q-blocks.

11. The system of claim 9, wherein each time stamp abuts a boundary of its corresponding frame.

12. The system of claim 9, wherein the reference data frame and at least one subsequent data frame are transmitted via open air.

13. The system of claim 12, wherein the time stamp of the reference data frame is a time base for the time stamps of subsequent data frames within a transmission session.

14. The system of claim 13, wherein a time of transmission of each subsequent data frame is a function of the time stamp of the reference data frame, the corresponding number of symbols, and the symbol rate.

15. The system of claim 14, wherein the updated stamped system time value for the timestamp of the subsequent data frame is defined in accordance with the expression $(ts1=ts0+\Delta t)$, where $(ts1)$ is the time stamp of the subsequent data frame, $(ts0)$ is the time stamp of the reference data frame, and wherein $\Delta t$ is defined as the corresponding number of symbols $(s0)$ divided by the symbol rate.

16. The system of claim 14, wherein the updated stamped system time value for the timestamp of the subsequent data frame is defined in accordance with the expression $(ts1=ts0+\Delta t)$, where $(ts1)$ is the time stamp of the subsequent data frame, $(ts0)$ is the time stamp of the reference data frame; and
    wherein $(\Delta t)$ is defined as a time lapse between the time stamp of the reference data frame and the time stamp of the subsequent data frame.

* * * * *